May 12, 1931. E. A. FELTMAN ET AL 1,804,922
GLARE ELIMINATOR
Filed Nov. 21, 1928
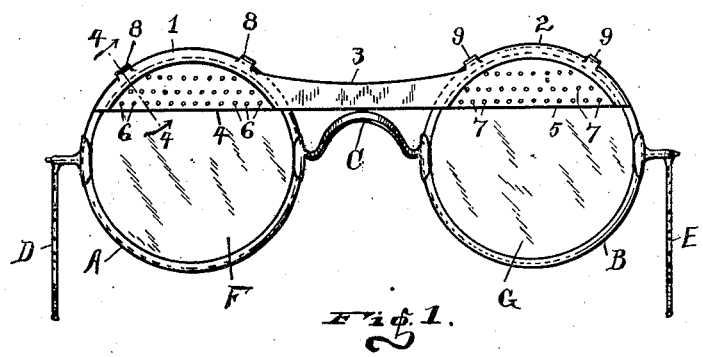
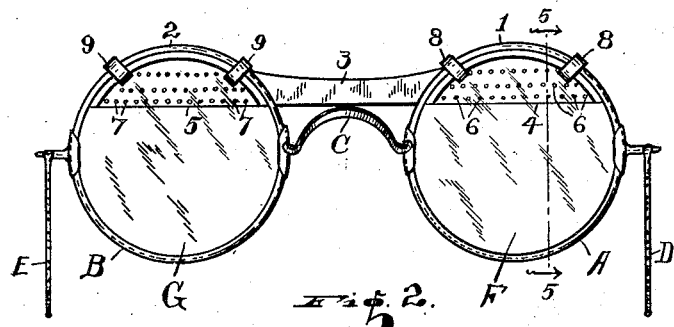
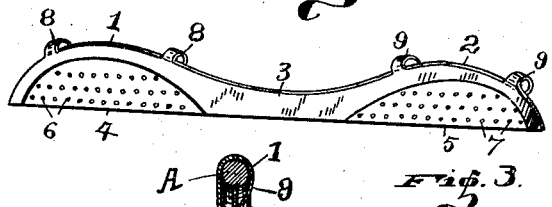
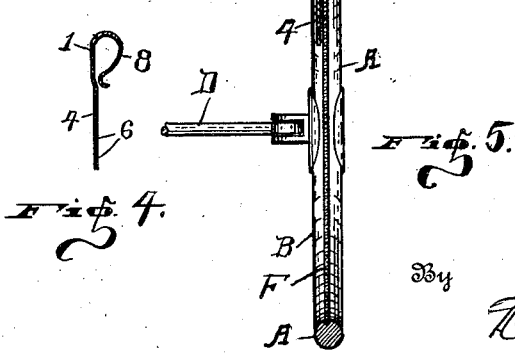
Inventors:
Edward A. Feltman,
and
Ezra C. A. Wickemeyer;
By
Attorney.

Patented May 12, 1931

1,804,922

UNITED STATES PATENT OFFICE

EDWARD A. FELTMAN AND EZRA C. A. WICKEMEYER, OF RICHMOND, INDIANA

GLARE ELIMINATOR

Application filed November 21, 1928. Serial No. 320,881.

The object of our present invention, broadly speaking, is the provision of a glare eliminator which is simple in construction; efficient in practice; easily and quickly placed in and removed from operative condition; occupying but a minimum of space; adapted to move with the movements of one's head, whereby it will be automatically adjusted; and which can be manufactured and sold at a comparatively low price.

The specific object of our invention is to provide a device adapted to be removably attached to one's spectacles or vision glasses, whereby the glare from bright lights, such as that from the sun or bright headlights of automobiles, may be eliminated or reduced to a minimum but without interfering with the vision of the wearer thereof, and without the necessity of one employing his hands for the adjustment thereof.

Other minor objects and advantages of our invention will be made apparent in the course of the following specification.

One manner of carrying out the principles of our invention in a practical, economical, and efficient manner is shown in the accompanying drawings, in which—Figure 1 is a front elevation of our invention in operative position in connection with spectacles, or eyeglasses. Figure 2 is a rear elevation of the same. Figure 3 is a front elevation of our device alone. Figure 4 is a cross section of our device alone, as taken on the line 4—4 of Fig. 1. And Figure 5 is a cross section, taken on an enlarged scale, of our device and the spectacles with which they are connected, taken for instance on line 5—5 of Fig. 2.

Similar indices denote like parts throughout the several views. The spectacle frame comprises the rims A and B, which are connected by the bridge member C, and having the arms or temple members D and E hinged to the respective members A and B in the usual manner immaterial to this invention.

Mounted in the members A and B are the respective lenses F and G, which are such as to suit the particular wearer thereof.

Our invention proper is in the nature of a shield, which is yoke-shaped in elevation, and it comprises two segmental portions 1 and 2 which are spaced apart and are connected by the bridge portion 3. Numerals 4 and 5 denote segmental semi-transparent shield members proper, with the curvature of their upper edges corresponding with the curvature of the respective members 1 and 2, with which they are integral; and their lower edges are even with the lower edge of the bridge member 3, that is with the lower edges of the members 3, 4 and 5 forming a perfectly straight line throughout the device.

Each of the members 4 and 5 are formed semi-transparent by means of a multitude of very small or infinitesimal apertures 6 and 7 respectively, formed therethrough throughout their extent which, together, permits a person to see distinctly through the members 4 and 5 but at the same time eliminating any objectional glare from the sun or from electric light or the like. Extending rearwardly and downwardly, in a compound curve, from the upper edge of each of the members 1 and 2, are a plurality of spring clips, as the clips 8 and 9, respectively, as shown in all of the views of the drawings.

Each of said clips is substantially S-shaped, when viewed edgewise, whereby when the members 4 and 5 are in contact with the front sides of lenses the said clips will each contact at one point with the rear side of the respective lenses, whereby our device will be securely, yet removably, attached to the spectacles, and by reason of the rounded contact of the clips with the lenses; and by reason of the end portions of the clips being curved outward, it is apparent that the device may be very easily placed in position or removed and without scratching the lenses or spectacle frame. Preferably our device, including all of said parts indicated by numerals, is made of a single piece of material, such as spring sheet metal or its equivalent.

In practice one may use his ordinary spectacles, placing our device in connection therewith as in Figs. 1 and 2, whereby the device will be in such position that it will not interfere with one's vision through the lenses alone, especially if one's head is tipped slightly backward. However in the event of a bright light coming to one's eyes then all one has to do is to slightly incline his head forward whereby the offending light or glare will first strike the members 4 and 5 by which the glare will be dissipated and practically eliminated, as far as the user of our device is concerned, yet still permitting one to see distinctly, thereby accomplishing the desideratum of this invention.

Our device may be retained continuously on one's spectacles, as it will not interfere with one's vision, or it may be removed and then placed on the spectacles only when interfering glare is anticipated. Or, if desired, our device may be built into the spectacles and made a permanent part thereof.

It is to be understood that various changes may be made in the details of construction without departing from the spirit of our invention or sacrificing any of the advantages thereof which are new and useful.

Having now fully shown and described our invention, what we claim and desire to secure by Letters Patent of the United States, is—

In combination with spectacles, a glare eliminator consisting of a single piece of sheet metal having closely associated very small apertures formed therethrough and extending throughout, said eliminator being formed to provide two segmental portions spaced apart and corresponding in contour with the upper edges of the spectacles, with a bridge portion to correspond with the nose piece of the spectacles and connecting said segmental portions, and a plurality of tongues radiating from the upper edges of the segmental portions and bent over the upper portions of the spectacles forming clips retaining the glare eliminator in connection with the spectacles.

EDWARD A. FELTMAN.
EZRA C. A. WICKEMEYER.